United States Patent
Sirgue et al.

(10) Patent No.: US 7,725,266 B2
(45) Date of Patent: May 25, 2010

(54) SYSTEM AND METHOD FOR 3D FREQUENCY DOMAIN WAVEFORM INVERSION BASED ON 3D TIME-DOMAIN FORWARD MODELING

(75) Inventors: Laurent Sirgue, Houston, TX (US); John T. Etgen, Houston, TX (US); Uwe Albertin, Houston, TX (US); Sverre Brandsberg-Dahl, Houston, TX (US)

(73) Assignee: BP Corporation North America Inc., Warrenville, IL (US)

( * ) Notice: Subject to any disclaimer, the term of this patent is extended or adjusted under 35 U.S.C. 154(b) by 433 days.

(21) Appl. No.: 11/756,384

(22) Filed: May 31, 2007

(65) Prior Publication Data

US 2007/0282535 A1 Dec. 6, 2007

Related U.S. Application Data

(60) Provisional application No. 60/809,507, filed on May 31, 2006.

(51) Int. Cl.
*G01V 1/30* (2006.01)
*G01V 1/28* (2006.01)
*G01V 1/00* (2006.01)

(52) U.S. Cl. .......................... 702/17; 166/254.1; 175/50; 367/38; 702/6; 702/11; 702/189

(58) Field of Classification Search .............. 73/152.01, 73/152.02, 570, 584, 587, 594; 166/244.1, 166/250.01, 254.1; 175/40, 50; 181/101, 181/108; 324/323; 367/14, 15, 25, 36, 37, 367/38, 73; 702/1, 2, 6, 11, 14, 16, 17, 18, 702/127, 187, 189, 190, 191; 703/6, 9, 10
See application file for complete search history.

(56) References Cited

U.S. PATENT DOCUMENTS 3,015,085 A * 12/1961 Piety ............................ 367/37
3,226,535 A * 12/1965 Thompson ................... 708/819
3,292,144 A * 12/1966 Lee et al. ...................... 367/41
3,370,268 A * 2/1968 Dobrin et al. ................. 367/44

(Continued)

OTHER PUBLICATIONS

Dessa, J.-X, Operto, S., Kodaira, S., Nakanishi, A., Pascal, G., Virieus, J., and Kaneda, Y., Multiscale Seismic Imaging of the Eastern Nankai Trough by Full Waveform Inversion, Sep. 23, 2004, vol. 31, Publisher: Geophysical Research Letters, Published in: US.

(Continued)

*Primary Examiner*—Edward R Cosimano
(74) *Attorney, Agent, or Firm*—Albert K. Shung

(57) ABSTRACT

According to a first preferred aspect of the instant invention, there is provided an efficient method of computing a 3D frequency domain waveform inversion based on 3D time domain modeling. In the preferred arrangement, 3D frequency domain wavefields are computed using 3D time-domain modeling and a discrete Fourier transformation that is preferably computed "on the fly" instead of solving the large systems of linear equations that have traditionally been required by direct frequency domain modeling. The instant invention makes use of the theory of gradient-based waveform inversion that estimates model parameters (for example velocities) by matching modeled data to field data sets. Preferably the modeled data are calculated using a forward modeling algorithm.

16 Claims, 5 Drawing Sheets

U.S. PATENT DOCUMENTS

| | | |
|---|---|---|
| 6,678,207 B2 | 1/2004 | Duren |
| 6,763,305 B2* | 7/2004 | Bernitsas .................. 702/14 |
| 2005/0065758 A1 | 3/2005 | Moore |

OTHER PUBLICATIONS

Lee, Ki Ha and Kim, Hee Joon, Source-Independent Full Waveform Inversion of Seismic Data, Apr. 11, 2003, pp. 2010-2015, vol. 68, No. 6, Publisher: Geophysics, Published in: US.

Lee, Ki Ha, 3-D Full Waveform Inversion of Seismic Data, Pat I., Theory, 2003, Publisher: Lawrence Berkely National Laboratory, Published in: US.

Operto, S., Vrieus, J., and Dessa, J.X., Frequency-Domain Full-Waveform Inversion of OBS Wide-Angle Seismic Data, , Publisher: UMR Geosciences Azur 6526.

Operto, S., Ravaut, C., Improta, L., Virieus, J., Herrero, A., and Aversana, P. Dell, Quantitative Imaging of Complex Structures From Dense Wide-Aperture Seismic Data by Multiscale Travetime and Waveform In, 2004, pp. 625-651, No. 52, Publisher: Geophysical Prospecting, Published in: France.

Pratt, R. G., Song, Z.-M., Wiliamson, P., and Warner, M., Two-Dimensional, Velocity Models From Wide-Angle Seismic Data by Wavefield Inversion, 1996, pp. 323-340, vol. 124, Publisher: Geophys. J. Int., Published in: US.

Pratt, R. Gerhard, Seismic Waveform Inversion in the Frequency Domain, Part 1: Theory and Verification in a Physical Scale Model, Jan. 11, 1999, pp. 888-901, vol. 64, No. 3, Publisher: Geophysics, Published in: US.

Ravaut, C., Operto, S., Improta, L., Virieux, J., Herrero, A., and Aversana, P. Dell; Multiscale Imaging of Complex Structures From Multifold Wide-Aperture Seismic Data by Frequency-Domain Full-Waveform Tomography: Application to a Thrust Belt, Aug. 2004, vol. 159, pp. 1032-1056, Published in: US.

Sen, Mrinal K., Hybrid Linear/Nonlinear Methods of Seismic Waveform Inversion, Jun. 14, 2002, Publisher: University of Texas Institute for Geophysics, Published in: US (Abstract Only).

Shipp, Richard M. and Sing, Satish C., Two-Dimensional Full Wavefield Inversion of Wide-Aperature Marine Seismic Streamer Data, 2002, pp. 325-344, No. 151, Publisher: Geophys. J. Int., Published in: US.

Tarantola, Albert, Inversion of Seismic Reflection Data in the Acoustic Approximation, Aug. 1984, pp. 1259-1265, vol. 49, No. 8, Publisher: Geophysics, Published in: US.

Pica, A., et al., "Nonlinear Inversion of Seismic Reflection Data in a Laterally Invariant Medium", Mar. 1990, pp. 294-292, vol. 55, No. 3, Publisher: Geophysics, Published in: US.

Song, Zhong-Min, et al., "Frequency-Domain Acoustic-Wave Modeling and Inversion of Crosshole Data: Part II-Inversion Method, Synthetic Experiments and Real-Data Results", May-Jun. 1995, pp. 796-809, vol. 60, No. 3, Publisher: Geophysics, Published in: US.

Yilmaz, "Seismic Data Processing", 1987, Chpt. 1, pp. 9-89, Publisher: Society of Exploration Geophysists, Published in: US.

Yilmaz, "Seismic Data Processing", 1987, Chpt. 6, pp. 384-427, Publisher: Society of Exploration Geophysicists, Published in: US.

* cited by examiner

SYSTEM AND METHOD FOR 3D FREQUENCY DOMAIN WAVEFORM INVERSION BASED ON 3D TIME-DOMAIN FORWARD MODELING

RELATED CASE

This application claims the benefit of expired U.S. Provisional Patent Application Ser. No. 60/809,507 filed on May 31, 2006, and incorporates said provisional application by reference into this disclosure as if fully set out at this point.

TECHNICAL FIELD

This invention relates to the general subject of seismic exploration and, in particular, to methods for quantifying and visualizing complex subsurface structures with seismic data.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is positioned at various locations near the surface of the earth above a geologic structure of interest. Each time the source is activated, it generates a seismic signal that travels downward through the earth, is reflected or transmitted, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface, sometimes as a series of closely spaced adjacent two-dimensional lines and in other cases as a grid of source and receiver lines that are arranged to be at some other angle with respect to each other. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. (Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Of course, the ultimate goal is to obtain a clear and undistorted image of the subsurface. To that end, there has been—and continues to be—ongoing research that is aimed at mathematically transforming a seismic section or volume into a true earth model that is consistent with the observed data. One of the more promising, if computationally intensive, approaches has been full waveform seismic waveform inversion. Broadly speaking, the "inverse problem" attempts to estimate physical properties of the Earth from the recorded seismic data. Such model properties might include 2D or 3D subsurface velocities, densities, etc., wherein the model parameters are to be estimated at each point of a subsurface grid or volume. In most approaches, an iterative procedure is utilized wherein the current subsurface model is used to generate a synthetic seismic data set. The model is then updated as a function of the difference between the recorded seismic data and the synthetic data set.

Of particular interest for purposes of the instant invention, frequency-domain waveform inversion is a technique that has been suggested as a way to determine the subsurface velocities from seismic data. Those of ordinary skill in the art will recognize that this method traditionally requires the computation of frequency domain wave fields using forward modeling. However, because of the computational difficulties involved with solving the 3D frequency domain forward modeling problem, applications to synthetic and field data have been largely limited to 2D implementations. What is needed, of course, is a method of frequency-domain waveform inversion that can be applied to both 2D and 3D data.

The following publications, each incorporated herein by reference as if fully set out at this point, are examples of prior art approaches to wave field inversion.

S. Operto, C. Ravaut, L. Improta, J. Virieux, A. Herrero and P. Dell'Aversana, Quantitative imaging of complex structures from dense wide-aperture seismic data by multiscale traveltime and waveform inversions: a case study. Geophysical Prospecting, 52, 625-651, 2004, Pica, A., Diet, J., and Tarantola, A., 1990, Nonlinear inversion of seismic reflection data in a laterally invariant medium: Geophysics, 55, no. 03, 284-292.

Pratt, R. G., Song, Z.-M., Williamson, P., and Warner, M., 1996, Two-dimensional velocity models from wide-angle seismic data by wavefield inversion: Geophys. J. Int., 124, 323-340.

Shipp, R. M., and Singh, S. C., 2002, Two-dimensional full wavefield inversion of wide-aperture marine seismic streamer data: Geophys. J. Int., 151, 325-344.

Sirgue, L. and Pratt, R. G., 2004, Efficient waveform inversion and imaging: A strategy for selecting temporal frequencies: Geophysics, Soc. of Expl. Geophys., 69, 231-248.

Song, Z. M., Williamson, P. R., and Pratt, R. G., 1995, Frequency-domain acoustic-wave modeling and inversion of crosshole data: Part ii: Inversion method, synthetic experiments and real-data results: Geophysics, 60, no. 03, 796-809.

Tarantola, A., 1984a, Inversion of seismic reflection data in the acoustic approximation: Geophysics, 49, no. 08, 1259-1266.

Heretofore, as is well known in the seismic processing and seismic interpretation arts, there has been a need for a computationally efficient method of waveform inversion that can be applied to both 2D and 3D data sets. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a first preferred aspect of the instant invention, there is provided an efficient method of computing a 3D frequency domain waveform inversion based on 3D time domain modeling. In the preferred arrangement, 3D frequency domain wavefields are computed using 3D time-domain modeling and discrete Fourier transformation that is preferably computed "on the fly" instead of solving the large systems of linear equations that have traditionally been required by direct frequency domain modeling.

According to a first preferred aspect, the instant invention makes use of the theory of gradient-based waveform inversion that estimates model parameters (for example velocities) by matching modeled data to field data sets. Preferably the modeled data are calculated using a forward modeling algorithm.

By way of summary, the instant invention makes practical for the first time a full 3D implementation of frequency-domain waveform inversion through the use of time-domain finite-difference forward modeling. The use of time-domain finite-difference modeling reduces the computational cost of the inversion by several orders of magnitude, allowing such to be performed on existing computer hardware.

In the preferred embodiment, the following general steps are followed in implementing the instant invention:

1. The frequency-domain wavefield is extracted during the computation of the time-domain wavefield by performing a discrete Fourier transform integrated over time steps. Preferably, a second order in time and a high-order (e.g., a fourth order) in space finite difference time domain forward modeling algorithm will be used.
2. The frequency-domain wavefield is used to compute the data residuals.
3. The residuals are back-propagated, preferably using the same combination of time-domain forward modeling and discrete Fourier transform as was used in Step 1. An additional step is preferably performed during the back-propagation which consists of calculating an inverse discrete Fourier transform of the frequency-domain data residuals back to the time domain.
4. The frequency domain gradient is then computed by multiplication of the forward by the backward propagated wavefield. In addition, the gradient is preferably multiplied by a factor that is dependent on the chosen model parameterization, i.e., whether the model is velocity based, density based, etc.
5. The model is preferably updated in the direction of the gradient scaled by a computed scalar, the step length.

The previous steps are typically repeated until a predetermined number of iterations have been performed or until some convergence criterion is met. This operation may be repeated for several frequencies in order to cumulate frequencies in the misfit function.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

Figure 1:
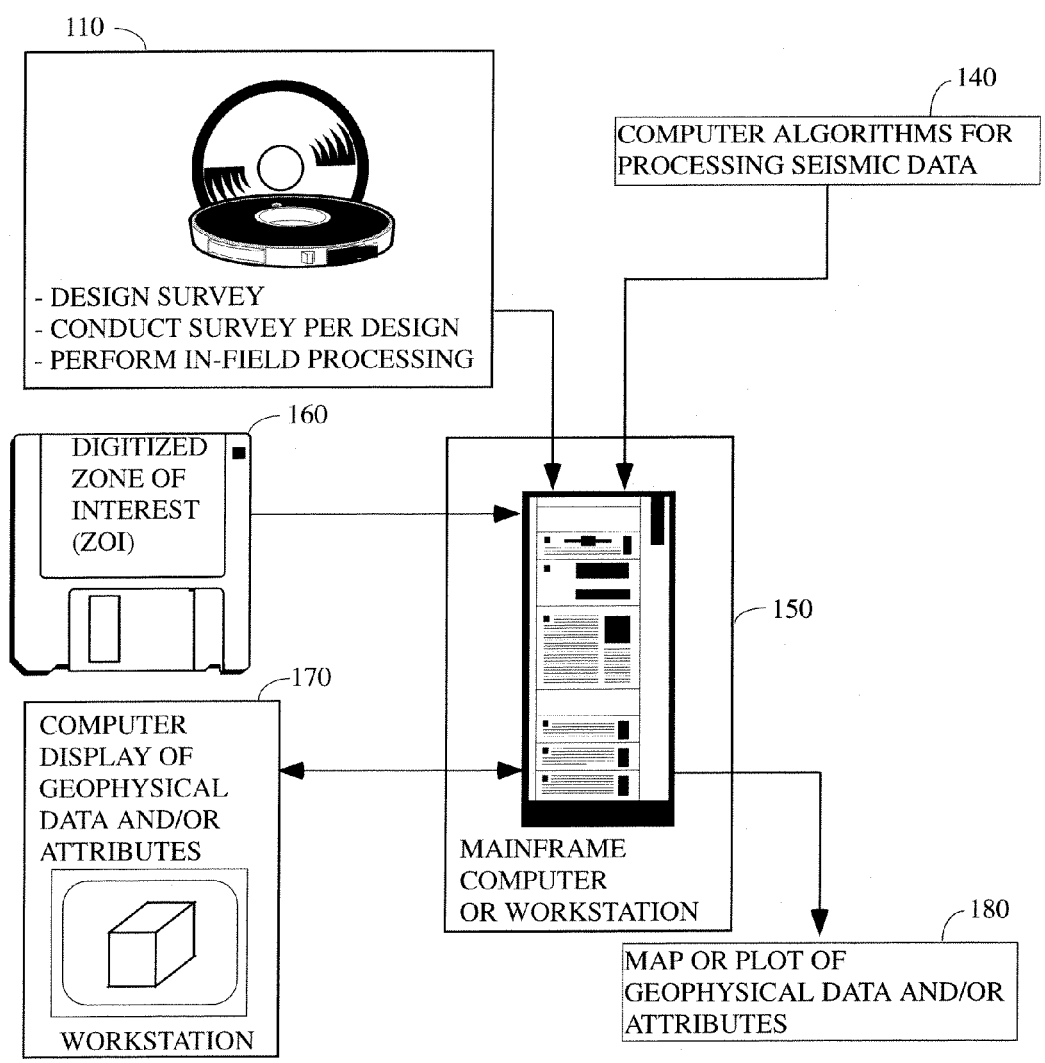
FIG. 1 illustrates a general environment of the instant invention.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which the instant invention would typically be used. As a preliminary step 110, it is customary to undertake at least some basic planning of a seismic survey in advance of conducting it. In addition to determining the location of the survey on the surface of the earth, typically survey-related parameters such as the trace/shot spacing, sample rate, number of recording channels, etc., will also be specified in advance of conducting the survey. Seismic surveys are conducted both onshore and offshore, with geophones typically being used to record the seismic source on land and hydrophones being used in marine environments. Additionally, and depending on the capabilities of the crew that acquires the seismic data, some amount of pre-processing (e.g., demux, source cross-correlation, debubble, etc.) might be performed on-site as the data are acquired (e.g., see step 215 of FIG. 2).

In the field, each receiver (or receiver group) typically gives rise to one seismic trace each time the source is activated and the raw/unprocessed traces are typically written to a mass storage medium (e.g., magnetic tape, optical disk, magnetic disk, etc.) for transmission to the processing center. In the processing center a variety of preparatory processes are typically applied to the seismic traces to prepare them for a wide range of processing and imaging steps that conventionally follow. See steps 215 and 220 of FIG. 2 for some examples of these sorts of processes. The seismic traces (before, during, and after initial processing) might be stored, by way of example only, on hard disk, magnetic tape, magneto-optical disk, DVD disk, or other mass storage means. Note that it is conventional to associate each seismic trace with the position of the receiver (or receiver group) that gave rise to it and this is often done during the preparatory processing.

In the processing center, a variety of signal conditioning and/or imaging steps are typically performed. In the preferred arrangement, these steps will take the form of computer programs 140 that have been loaded onto a general purpose programmable computer 150 where they are accessible by a seismic interpreter or processor. Note that a general purpose computer 150 would typically include, in addition to mainframes, specialized workstations and PCs, computers that provide for parallel and massively parallel computations, wherein the computational load is distributed between two or more processors.

As is further illustrated in FIG. 1, in the preferred arrangement some sort of digitized zone of interest model 160 is often specified by the user and provided as input to the processing computer programs. This zone of interest might correspond to a particular reflector or layer in the subsurface that is believed to trap or contain hydrocarbon resources. In the case of a 3D seismic section, the zone of interest 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those of ordinary skill in the art will recognize that this might be done any number of ways.

Figure 2:
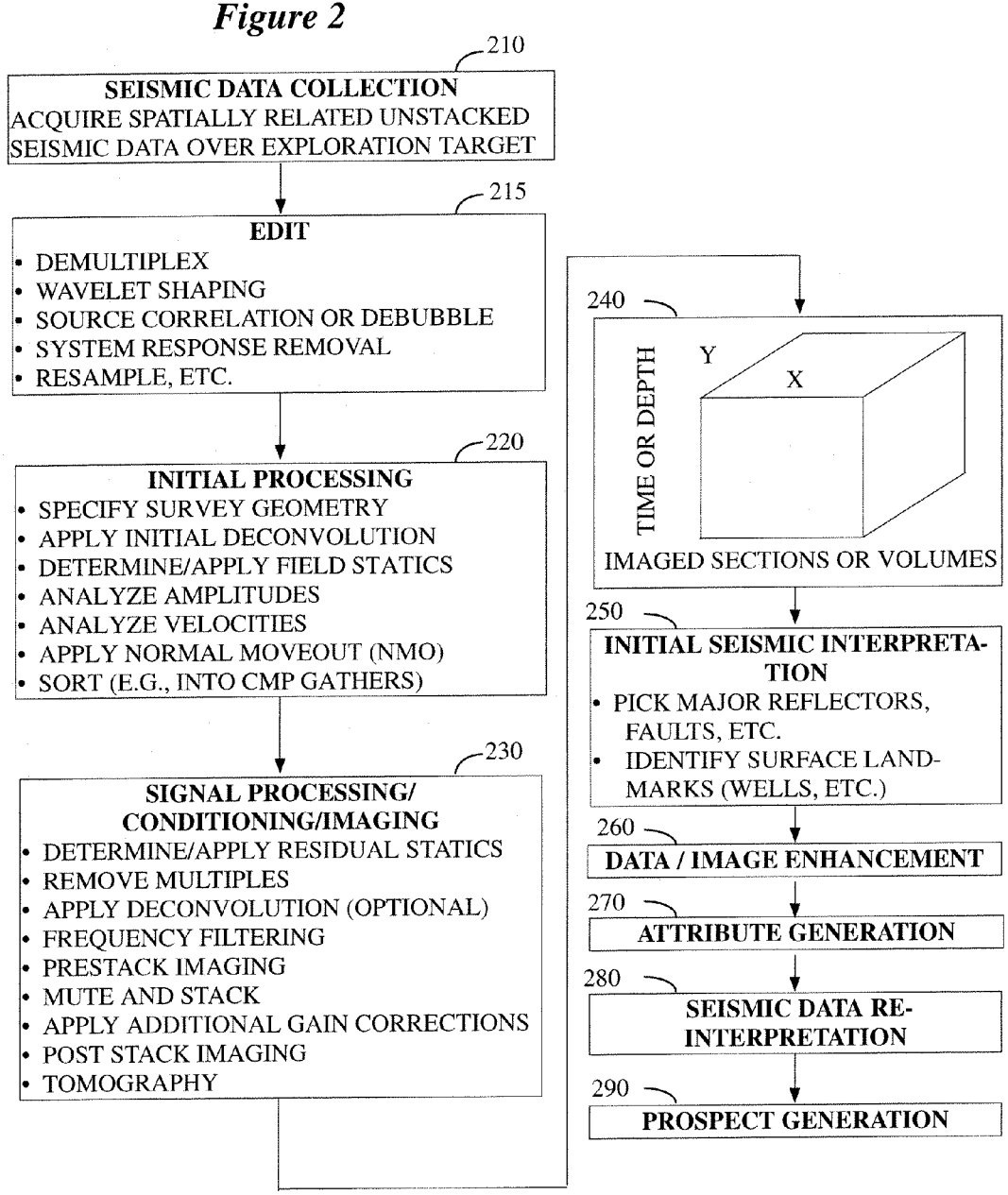
FIG. 2 contains a seismic processing sequence suitable for use with the instant invention.

Seismic processing programs 140 might be conveyed into the computer that is to execute them by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a wired or wireless network. In a typical seismic processing environment, the various numerical treatments that are applied to the seismic data would be made part of a package of software modules that is designed to perform many of the processing steps listed in FIG. 2. Note that FIG. 2 is intended to represent a generalized processing scheme that describes in a general way processes that would be suitable for use with either land or marine data. Of course, those of ordinary skill in the art will recognize that land specific data processing steps in FIG. 2 such as vibrator source correlation, surface statics, etc., would not typically be applicable to marine data, as debubble would not typically be used on land data.

Returning to FIG. 1, the processed seismic traces would then typically be sorted into CMP gathers (3-D data will typically be binned into CMPs), stacked, and displayed either at a high-resolution color computer monitor 170 or in hardcopy form as a printed seismic section or a map 180. The seismic interpreter would then use the displayed images to assist him or her in identifying subsurface features conducive to the generation, migration, or accumulation of hydrocarbons.

As was indicated previously, seismic traces that have been acquired according to the instant invention will preferably be subjected to some or all of the processing steps listed in FIG. 2. Those of ordinary skill in the art will recognize that these steps are only broadly representative of the sorts of processes that might be applied to such data and the choice and order of the processing steps, and the particular algorithms involved, may vary markedly depending on the individual seismic processor, the signal source (dynamite, vibrator, air gun, etc.), the survey location (onshore, offshore, combination, etc.), the company that processes the data, etc.

As an initial step a 2D or 3D seismic survey is conducted according to the instant invention over a particular volume of the earth's subsurface (step 210). The data collected in the field consist of unstacked (i.e., unsummed) seismic traces which contain digital information representative of the volume of the earth lying beneath the survey After the seismic data are acquired (step 210), they are typically taken from the field to a processing center where some initial or preparatory processing steps are applied to them. Demux, gain recovery, cross correlation, wavelet shaping, bad trace removal, etc., (step 215) are typically applied early in sequence and are designed to place the field seismic records in condition for subsequent processing. That being said, those of ordinary skill in the art will recognize that some or all of the foregoing processes (e.g., demux, cross correlation, initial gain recovery, etc.) might be preformed in the field (rather than in a processing center), depending on the processing capability available there. This might be followed by specification of the geometry of the survey (step 220) and storing of a shot/receiver number and a surface location as part of each seismic trace header. Once the geometry has been specified, it is customary to perform a velocity analysis, the resulting velocities being useful in many processing contexts including, by way of example only, time and/or depth imaging.

After the initial pre-stack processing is completed, typically the seismic signal on the unstacked seismic traces will be conditioned before stacked (or summed) data volumes (step 230) are created. In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

As is suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 and/or attribute generation (step 270) of the stacked or unstacked seismic data. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Typically, the instant invention would be implemented as part of step 230.

Preferred Embodiments

Figure 3:
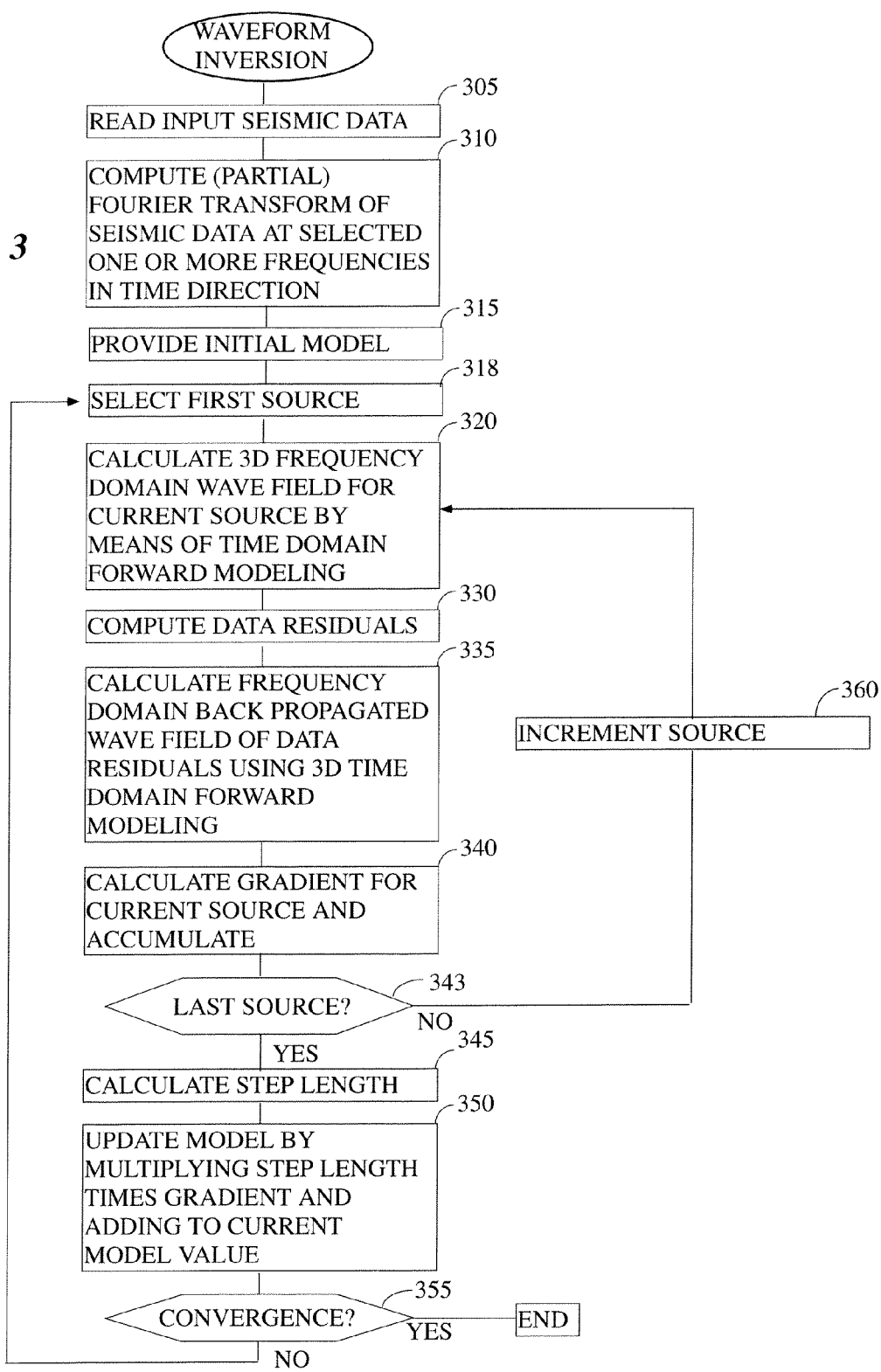
FIG. 3 illustrates a preferred logic suitable for use with the instant invention.

According to a first preferred embodiment and as is generally illustrated in FIG. 3, there is provided herein a method of seismic waveform inversion which is much more computationally efficient than has heretofore been known. In more particular, the instant invention teaches a more efficient method of calculating a full 3D frequency domain waveform inversion of seismic data that utilizes a time domain propagator. Some of the main components of FIG. 3 are further illustrated in the program fragment contained in Table 1 below:

TABLE 1

```
CALL READ MODEL
CALL READ SEISMIC (frequency domain) => data(irec,isrc)
Do iter=1,niter
C loop over sources
Do isrc=1,ns
   CALL Table 2 => wave(iz,ix,iy,ifreq)
C the calculated data is the value of the wavefield
C at the receiver location.
C loop over receivers
   Do irec=1,nrec
      do ifreq=1,nfreq
         calc(irec,isrc,ifreq)=wavef(izrec,ixrec,iyrec,ifreq)
         Residuals(irec,isrc,ifreq)=calc(irec,isrc,ifreq)–data(irec,isrc,ifreq)
      enddo
   enddo
   CALL Table 3 => bwave(iz,ix,iy,ifreq)
C compute gradient for this source
do iy=1,ny
   do ix=1,nx
      do iz=1,nz
         do ifreq=1,nfreq
            gradient(iz,ix,iy,ifreq)=wave(iz,ix,iy,ifreq)*bwave(iz,ix,iy,ifreq)
C accumulate gradient
            gradient_TOT(iz,ix,iy)= gradient(iz,ix,iy,ifreq) +
            gradient_TOT(iz,ix,iy)
         enddo
      enddo
   enddo
enddo
Enddo ! END SOURCE LOOP
Call Compute steplength
Call update model
Enddo ! END ITERATION LOOP
```

As is indicated in FIG. 3, as a first preferred step 305 the input seismic data will be read or otherwise accessed. Those of ordinary skill in the art will recognize that the data that are accessed might be stored in local memory or disk, or remotely and accessed over a network. Of course, depending on the size of the data set it may not all be read at one time but instead read incrementally as needed. Those of ordinary skill in the art will readily be able to devise such alternatives.

According to a next preferred step 310, a 1D time-direction discrete Fourier transform will preferably be computed from the input data. Note that, because in the preferred embodiment only one or a few frequencies will need to be transformed, a discrete Fourier transform is likely to be superior computationally to a conventional fast Fourier transform (FFT). Indeed, there are well known methods for calculating only a few such Fourier coefficients (whether real or imaginary) such as, by way of example only, the Goertzel DFT algorithm. For purposes of clarity in the text that follows, the term "partial Fourier transform" will be used to refer to the calculation of one or more Fourier transform coefficients— whether or not that is done via a full Fourier transform. Note, of course, that according to the instant definition a "partial" Fourier transform could actually refer to the calculation of all of the Fourier transform coefficients, i.e., that term is intended to encompass the calculation a full Fourier transformation and all of its associated coefficients as the situation warrants. That being said, typically only a few selected coefficients will be needed. Finally, it should be noted and remembered that the Fourier transform is just one of a number of discrete orthonormal transforms and it is certainly possible that coefficients obtained via other such transforms (e.g., the Walsh transform, wavelet transforms, etc.) could be utilized in the place thereof.

Additionally with respect to step 310, it may be that the entire seismic trace will be utilized in computing the selected Fourier transform coefficients. However, it is common to use less than the entire trace in this computation. For example, in some cases the Fourier transform might be hung on (or perhaps encompass) a seismic event that changes in time throughout the volume. In other cases, an initial mute may have been applied to the trace and the Fourier transform window (or windows) might be chosen to avoid that portion of the data. Additionally, the data window (including its starting and/or ending time) that is used for this calculation might possibly differ for each trace. As a consequence, when the instant disclosure indicates that a Fourier transform is to be applied to a seismic trace, it should be understood and remembered that the entire seismic trace may not be utilized and, further, the calculation window might change from trace to trace.

Next, an initial subsurface model will be provided (step 315). Although that model might take many forms, in some preferred arrangements it will be a 3D depth (or time) model that represents the configuration of at least the major subsurface rock units and their internal velocities and, preferably, their densities as well. Such models are routinely generated and used in petroleum exploration and those of ordinary skill in the art will readily be able to construct same. Note that in the preferred embodiment this model will be an "initial" one, as it is anticipated that the model will be modified many times during the iterative scheme discussed below (i.e., steps 318-355). That being said, in some instances a single iteration might suffice.

Next, a loop over sources will be initiated, preferably by selecting a first source (step 318) and a last source or, in the alternative, by determining to process all available sources. By way of explanation, in some preferred embodiments the instant invention operates on one source gather at a time, a source gather being a collection of seismic traces or recordings that were recorded simultaneously following a single source excitation, where "single source" may be, for example, multiple vibrators operating simultaneously. Of course, a typical seismic survey contains many such gathers that have been collected from many different source excitations. The selection of a first source number (or, equivalently, the selection of a starting index number) will preferably be under control of the programmer or user. That being said, in the preferred embodiment the processing sequence will include the first shot in the survey, the last shot in the survey, and all shots in between. Further, although there are computational advantages to organizing the data into shot gathers, that is not a requirement of the instant invention and other trace organizations (e.g., by CMP, receiver, etc.) could certainly be used.

As a next preferred step 320, a 3D frequency domain wave field will be calculated at the selected frequency or frequencies by means of time domain forward modeling. A preferred implementation of this step is illustrated in greater detail in FIG. 4 and Table 2 below.

TABLE 2

```
do it=1,nt
  T=(it-1)*dt
DO TIME PROPAGATION=> wavefield at time it : wavef(iz,ix,iy)
c Then do DFT for each x,y,z location
  do iy=1,ny
```

TABLE 2-continued

```
    do ix=1,nx
      do iz=1,nz
c DFT
        do ifreq=1,nfreq
          wavef(iz,ix,iy,ifreq)=exp(2*PI*FREQ(ifreq)*T)*wavef(iz,ix,
            iy)+wavef(iz,ix,iy,ifreq)
        enddo
      enddo
    enddo
  enddo
enddo
```

Figure 4:
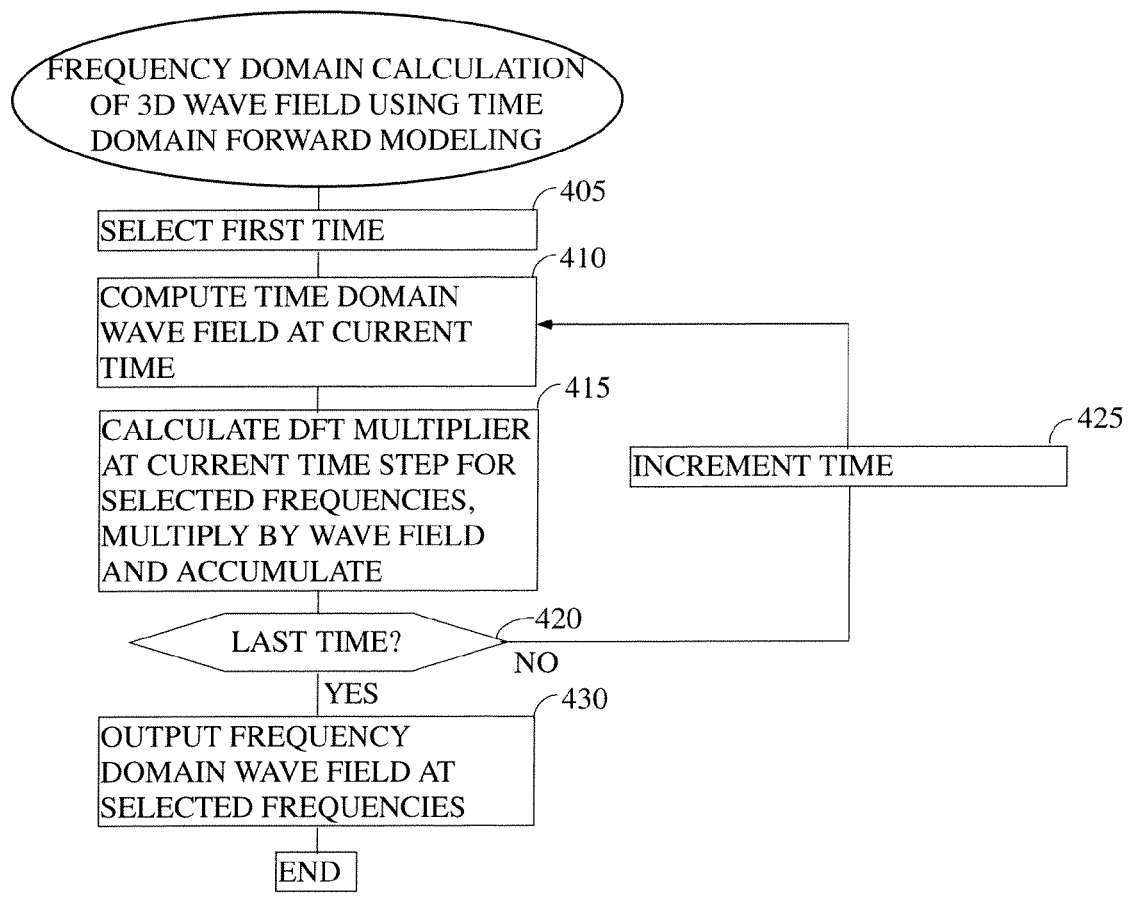
FIG. 4 contains a preferred logic diagram which illustrates a preferred method of computing a frequency domain 3D wave field using time domain forward modeling.

As is generally indicated in FIG. 4, although the computation of the wave field and the Fourier transform might easily be done in separate steps, the preferred approach is to simultaneously calculate the next downward step in time and then immediately multiply that value by the appropriate Fourier transform multiplier for that time. In Table 2 supra, the entries stored in the array FREQ(•) are the selected frequencies (or selected single frequency if only one has been selected) at which the instant method will operate. The steps that follow explain this approach more fully.

Turning now to the specific steps of FIG. 4, in the preferred embodiment a loop over time will be performed (steps 405 through 420, inclusive). To that end, a first time (or first time index) will necessarily be selected (step 405) which might be at zero or any other arbitrary time. Next, the time domain wave field will preferably be calculated at the currently selected time (step 410). This will preferably be either the selected first time (step 405) or some other time value deeper in the trace that is reached iteratively (i.e., via the "NO" branch of decision item 420) by incrementing the time variable (step 425).

As a next preferred step, the Fourier transform multiplier at the current time will be calculated and multiplied by the calculated value of the wave field (step 415) at each of the selected frequency or frequencies. The Fourier transform multiplier is simply the complex time-dependent numerical value that is generated as part of a standard Fourier transform calculation. Additionally, and as is indicated in this figure, preferably the product of the Fourier transform coefficient of the wave field value will be accumulated so that, at the end of the time iteration (i.e., the "YES" branch of decision item 420), the full frequency domain wave field will be available at the next step (i.e., step 430).

Returning now to the discussion of FIG. 3, as a next preferred step 330, the data residuals will be calculated. That is, preferably the wave field calculated in 320 will be subtracted from the Fourier transformed input data (step 310). The resulting residuals will then preferably be used as input to a routine that calculates the frequency domain back propagated wave field of using 3D time domain forward modeling (step 335). This step is discussed in greater detail in FIG. 5.

Figure 5:
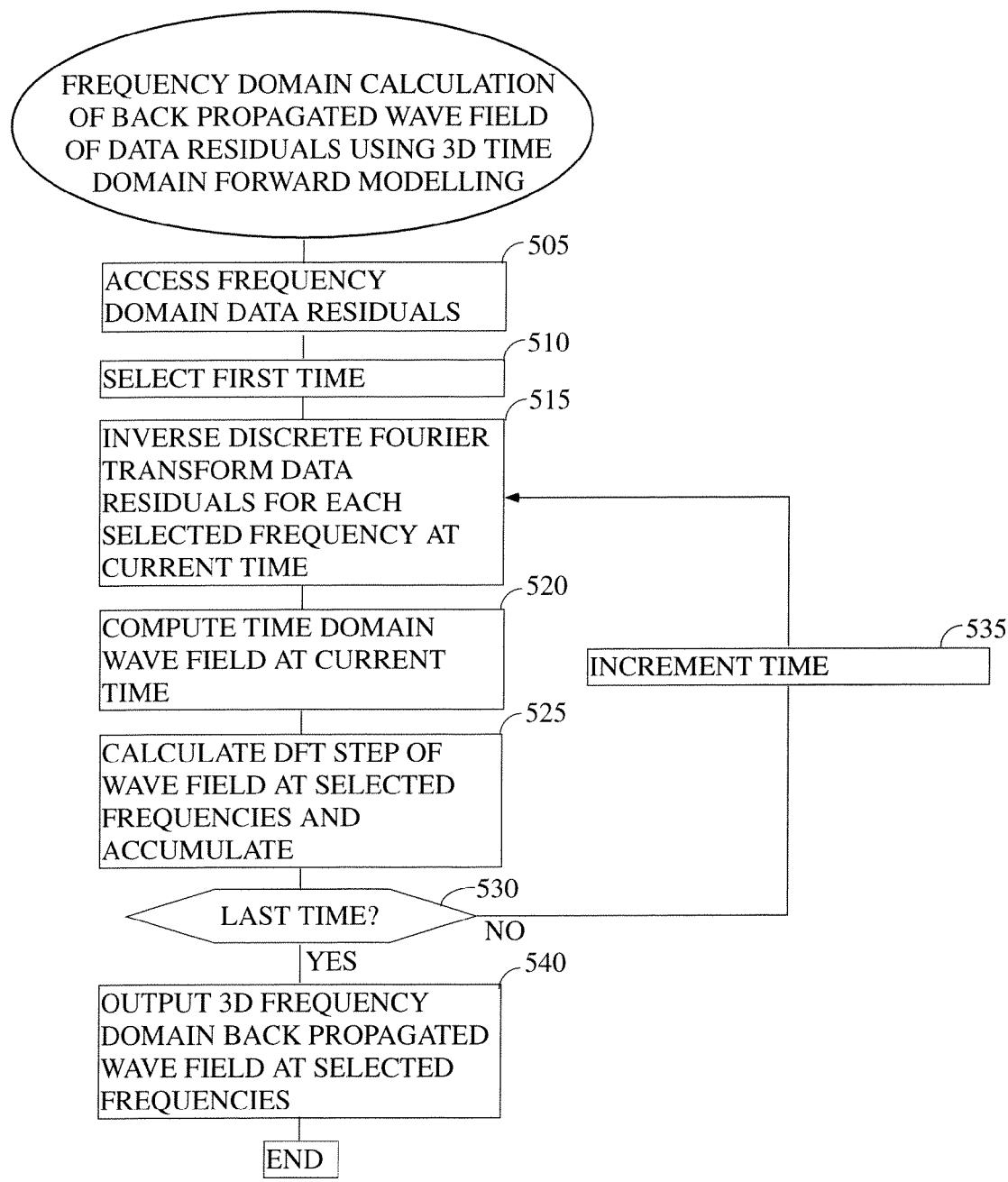
FIG. 5 illustrates a preferred series of steps suitable for use in calculating a frequency domain back propagated wave field from the data residuals using 3D time domain forward modeling.

Turning now to FIG. 5 and associated Table 3 below, as a first preferred step the frequency domain residuals calculated at step 330 will be accessed (step 505).

TABLE 3

```
do it=1,nt
c setup a source at each receiver location
c where the data residuals are the source term
c loop over receivers
  do irec=1,nrec
c Inverse DFT
    do ifreq=1,nfreq
```

TABLE 3-continued

```
sourcet(irec)=exp(-2*PI*FREQ(ifreq)*T)*conjg(residuals(irec,
   ifreq)+source(irec))
      enddo
   enddo
DO TIME PROPAGATION=> wavefield at time it : wavet(iz,ix,iy)
do DFT for each x,y,z location
   do iy=1,ny
      do ix=1,nx
         do iz=1,nz
c     DFT
         do ifreq=1,nfreq
            bwavef(iz,ix,iy,ifreq) = exp(2*PI*FREQ(ifreq)*T) *
               wavet(iz,ix,iy) + bwavef(iz,ix,iy,ifreq)
         enddo
      enddo
   enddo
enddo
enddo
```

Of course, those of ordinary skill in the art will recognize that by "accessed" is meant read from local or networked disk, read from memory, etc. As a next preferred step, a first (e.g., starting) time will be selected (step 510). This might be zero or any other arbitrary value, including an integer representing an array location in a seismic trace. Next, the instant method will preferably enter a loop over time (steps 515 through 530), wherein the "time" variable will be incremented at each pass (step 535). The preferred time increment is model dependent and will be chosen to minimize dispersion according to methods well known to those of ordinary skill in the art.

As a first preferred step in the iterative scheme, an inverse discrete Fourier transform will be calculated from the wave field residuals at the current time (step 515). Next, the time-domain wave field will preferably be calculated at the current time from the inverse Fourier transformed data residuals (step 520). That is, the data residuals after inverse discrete Fourier transform are used as sources in a back-propagation algorithm. Next, and in a manner similar to the approach of step 415, the discrete Fourier transform of the wave field at the current time will be calculated and accumulated (step 525).

Decision item 530 tests to see whether the final time has been processed and, if not, the routine returns to step 515 after incrementing the time variable (step 535). On the other hand, if the final time (which might be the last recorded time in the trace or any other arbitrary time value or index greater than the starting time) has been processed (the "YES" branch of decision item 530), the accumulated 3D frequency domain back propagated wave field will be passed to output (step 540), i.e., made available for use in step 340.

Returning now to FIG. 3, as a preferred next step 340, the gradient will be calculated for the current source and accumulated. In one preferred embodiment, the gradient is calculated by multiplying the wave field of step 320 times the wave field of step 335. Additionally, it should be noted that the gradient is preferably multiplied by a factor that is dependent on the chosen model parameterization (e.g., whether the model is velocity-based, density-based, etc.). Those of ordinary skill in the art will recognize that the gradient calculation might be performed in any number of ways and will be readily able to devise alternative methods of estimating this value.

Next, a determination will preferably be made as to whether or not the current source is the last one that is to be processed (decision item 343). Unless this is the last source (i.e., the "YES" branch of decision item 343), the preferred invention will follow the "NO" branch of decision item 343, increment the source counter (step 360) and return to step 320, after which the previous steps will be repeated with a different source gather.

As a next preferred step, a step length for the current iteration will be obtained, which step length might be either a predetermined constant value or, preferably, a calculated step length (step 345) obtained according to methods well known to those of ordinary skill in the inversion arts. For example, in the event that the step size is calculated, linear estimation (or, alternatively, a line search) is preferably used in some embodiments. Of course, those of ordinary skill in the art will recognize that the step length might be expressed as a scalar, a vector, a matrix, an operator, etc.

As a next preferred step, the subsurface model will be updated (step 350) using the step length and gradient calculated previously. The model that is updated might either be the initial model from step 315 (if this computation 350 is being made during the first pass through the algorithm) or a model that has been modified during a previously iteration. Either way, in the preferred arrangement the step length calculation from step 345 will be multiplied times the accumulated gradient from step 340, to yield a quantity that is preferably added to the current model, thereby updating it (step 350) for the next pass through the source loop.

Next, a test for convergence will preferably be performed (decision item 355). If convergence has been attained (and those of ordinary skill in the art will recognize how such determinations are typically made), the routine will preferably end. Otherwise, in the preferred arrangement, the instant method will then return to step 318, at which point the pointer to the current source will be reset to it's initial value.

By way of summary, the instant inventors have invented method of performing a full 3D frequency domain waveform inversion on a 3D seismic data set. Although the theory behind full waveform inversion has generally been known for over twenty years, heretofore no one has been able to devise a truly efficient way to calculate it in 3D. Those who do (2D) frequency domain waveform inversion utilize frequency domain forward modeling, unlike the instant invention. However, the instant invention calculated a frequency domain 3D wave field via time-domain forward modeling.

In the preferred embodiment, the instant invention will invert a seismic dataset at any frequency within a 1-15 Hz frequency band. In order to limit dispersion, preferably there will be four grid points per wavelength. Further, and preferably, the inversion will be performed for more than one (e.g., for 2 or 3) frequencies at the same time. Additionally, preferably the output from one frequency will be used as input for the next, e.g., 3 Hz→4 Hz→5 Hz, etc. That being said, obviously any frequency or combination of frequencies below the Nyquist frequency might potentially be used according to the instant invention.

It should be noted and remembered that, although time-domain finite difference modeling is preferably used, that is not the only possible approach. The only real criteria is that, whatever modeling method is utilized, the selected modeling method be relatively accurate and computationally efficient and that it be capable of solving the acoustic wave equation (or, alternatively, the elastic wave equation) by, e.g., time marching or time series expansion. As a consequence, methods such as pseudo spectral methods, spectral methods, spectral element methods, or series expansion methods could all potentially be useful in implementing the methods discussed herein. Additionally, those of ordinary skill in the art will recognize that, although use of an acoustic wave equation solution is the preferred approach because of its computational efficiency, in reality the instant method could also readily be implemented using an elastic wave equation solution, albeit at a somewhat higher computational cost. As a consequence, each time the term "acoustic equation" is used herein, that term should be understood to also include "elastic equation" as the situation warrants.

Still further, those of ordinary skill in the art will understand that in some cases exponential decay time damping and/or time windowing might be useful during the forward modeling step which would at least potentially accommodate variations in the inversion scheme.

Additionally, one benefit of the instant invention is that the final model that is produced by the method of FIG. 3 is an accurate velocity (or density, etc.) 3D subsurface model that is useful in a number of contexts. For example, the model by itself is useful as a seismic attribute that is representative of the rock (and potentially fluid) properties in the subsurface. Additionally, an accurate subsurface rock-parameter model (i.e., velocity, density, etc.) is invaluable for use in many of the processing steps of FIG. 2 (e.g., stack, migration, etc., are critically dependent on good subsurface velocity estimates). To the extent that the model that results from an application of the instant method is an accurate representation of the actual subsurface rock parameters, the resulting seismic data images that rely on this model will be improved and the likelihood of finding hydrocarbon resources will be enhanced.

Although the invention disclosed herein was largely discussed in terms of seismic traces organized into "source" gathers for processing purposes, that was done for purposes of specificity only and not out of any intent to limit the instant invention to operation on only that sorting scheme. Within the text of this disclosure, the terms seismic trace and seismic gather are intended to be used in the broadest possible sense, and they are meant to apply to conventional 2D and 3D traces and CMP gathers, as well as to other sorts of gathers which might include, without limitation, CRP gathers, CCP gathers (i.e., "common conversion point" gathers), CACP ("common asymptotic conversion point") gathers, common offset gathers, common shot/receiver gathers, etc, the most important aspect of a "gather" being that it represents an a collection of unstacked seismic traces from either a 2D or 3D survey organized according to some field or other parameter.

Further, although in the preferred embodiment time-domain modeling is used for the wavefield calculations required herein—and that is certainly the most efficient method of implementing the instant invention—those of ordinary skill in the art will recognize that other methods could certainly be used to obtain that quantity. What is critical, though, is that time-domain modeling be used to obtain at least one of the wavefields calculated in the course of obtaining the inversion taught herein.

Finally, in the previous discussion, the language has been expressed in terms of processing operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, full waveform sonic logs, ground penetrating radar, CSEM (controlled source electromagnetic data)/t-CSEM (transient controlled source electromagnetic data), any acquisition technique that records wave field data, or model-based digital simulations of any of the foregoing. Additionally, the methods claimed herein after can be applied to mathematically transformed versions of these same data traces including, for example: filtered data traces, migrated data traces, frequency domain Fourier transformed data traces; transformations by discrete orthonormal transforms; instantaneous phase data traces, instantaneous frequency data traces, quadrature traces, analytic traces; etc. In short, the process disclosed herein can potentially be applied to a wide variety of types of geophysical time series, but it is preferably applied to a collection of spatially related time series. Thus, when the term "seismic data" is used here, that term should be broadly construed to potentially include data collected from any of the foregoing sources and/or combinations of same.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of geophysical exploration within a predetermined volume of the earth containing subsurface structural and stratigraphic features conducive to the generation, migration, accumulation, or presence of hydrocarbons, comprising the steps of:
   a. selecting a 3D seismic data set, wherein at least a portion of said 3D seismic data set images said at least a portion of said predetermined volume of the earth, and wherein said 3D seismic data set comprises a plurality of seismic traces;
   b. computing a partial Fourier transform of at least a portion of said seismic traces in said 3D seismic data set, thereby producing a transformed 3D seismic data set;
   c. choosing an initial subsurface model;
   d. using at least said initial subsurface model to calculate a 3D frequency domain forward propagated wave field by time domain forward modeling;
   e. calculating a residual volume between said 3D frequency domain wave field and said transformed 3D seismic data set;
   f. calculating a 3D frequency domain back propagated wave field by 3D time domain forward modeling using at least said back propagated wave field;
   g. using at least said 3D frequency domain back propagated wave field and said 3D frequency domain forward propagated wave field to update said initial subsurface model, thereby producing an updated subsurface model; and,
   h. using said at least a portion of said updated subsurface model to explore for said subsurface structural and stratigraphic features conducive to the generation, migration, accumulation or presence of hydrocarbons within said predetermined volume of the earth.

2. A method of geophysical exploration according to claim 1, wherein step (h) comprises the steps of:
   (h1) performing at least steps (d) through (g) with said initial subsurface model replaced by said updated subsurface model, thereby producing a further updated subsurface model, and,
   (h2) using said at least a portion of said further updated subsurface model to explore for said subsurface structural and stratigraphic features conducive to the generation, migration, accumulation or presence of hydrocarbons within said predetermined volume of the earth.

3. A method of geophysical exploration according to claim 1, wherein step (g) comprises the steps of:

(g1) using at least said 3D frequency domain back propagated wave field and said 3D frequency domain forward propagated wave field to calculate a gradient volume, (g2) calculating a step length, and, (g3) using at least said gradient volume and said step length to update said initial subsurface model, thereby producing an updated subsurface model.

4. A method of geophysical exploration according to claim 1, wherein step (h) comprises the steps of (h1) storing at least a portion of said updated subsurface model on a computer readable medium; and, (h2) using said stored at least a portion of said updated subsurface model to explore for said subsurface structural and stratigraphic features conducive to the generation, migration, accumulation or presence of hydrocarbons within said predetermined volume of the earth.

5. A method according to claim 4, wherein said computer readable medium is selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

6. A method according to claim 1, wherein step (h) comprises the steps of:

(h1) displaying at least a portion of said updated subsurface model on a generally flat medium; and, (h2) using at least said displayed portion of said updated subsurface model to explore for said subsurface structural and stratigraphic features conducive to the generation, migration, accumulation or presence of hydrocarbons.

7. A method according to claim 6, wherein said generally flat medium is selected from a group consisting of a computer monitor and a piece of paper.

8. A method of geophysical exploration for natural resources within a predetermined volume of the earth, comprising the steps of:

a. selecting a 3D seismic data set, wherein at least a portion of said 3D seismic data set images said at least a portion of said predetermined volume of the earth, and wherein said 3D seismic data set comprises a plurality of seismic traces;

b. computing a partial Fourier transform of at least a portion of said seismic traces in said 3D seismic data set, thereby producing a transformed 3D seismic data set;

c. choosing a current subsurface model;

d. using at least said current subsurface model to calculate a 3D frequency domain forward propagated wave field by time domain forward modeling;

e. calculating a residual volume between said 3D frequency domain wave field and said transformed 3D seismic data set;

f. calculating a 3D frequency domain back propagated wave field by 3D time domain forward modeling using at least said back propagated wave field;

g. using at least said 3D frequency domain back propagated wave field and said 3D frequency domain forward propagated wave field to update said current subsurface model, thereby producing an updated subsurface model;

h. choosing said current subsurface model to be said updated subsurface model;

i. performing steps (d) through (g), thereby producing a further updated subsurface model; and, j. using said at least a portion of said further updated subsurface model to explore for said natural resources within said predetermined volume of the earth.

9. A method of geophysical exploration according to claim 8, wherein step (b) comprises the steps of:

(b1) computing a full Fourier transform of at least a portion of said seismic traces in said 3D seismic data set, thereby producing a transformed 3D seismic data set.

10. A method of geophysical exploration according to claim 8, wherein step (g) comprises the steps of:

(g1) using at least said 3D frequency domain back propagated wave field and said 3D frequency domain forward propagated wave field to calculate a gradient volume, (g2) calculating a step length, and, (g3) using at least said gradient volume and said step length to update said current subsurface model, thereby producing an updated subsurface model.

11. A method of geophysical exploration according to claim 8, wherein step (h) comprises the steps of (h1) storing at least a portion of said updated subsurface model on a computer readable medium; and, (h2) using said stored at least a portion of said updated subsurface model to explore for said subsurface structural and stratigraphic features conducive to the generation, migration, accumulation or presence of hydrocarbons within said predetermined volume of the earth.

12. A method according to claim 11, wherein said computer readable medium is selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

13. A method of geophysical exploration for natural resources within a predetermined volume of the earth, comprising the steps of:

a. selecting a 3D seismic data set, wherein at least a portion of said 3D seismic data set images said at least a portion of said predetermined volume of the earth, and wherein said 3D seismic data set comprises a plurality of seismic traces;

b. selecting at least one frequency;

c. computing a partial Fourier transform of at least a portion of said seismic traces in said 3D seismic data set with respect to said at least one frequency, thereby producing a transformed 3D seismic data set;

d. choosing a current subsurface model;

e. using at least said current subsurface model to calculate a 3D frequency domain forward propagated wave field by time domain forward modeling;

f. calculating a residual volume between said 3D frequency domain wave field and said transformed 3D seismic data set;

g. calculating a 3D frequency domain back propagated wave field by 3D time domain forward modeling using at least said back propagated wave field;

h. using at least said 3D frequency domain back propagated wave field and said 3D frequency domain forward propagated wave field to update said current subsurface model, thereby producing an updated subsurface model;

i. performing at least steps (d) through (g) using said updated subsurface model in place of said current subsurface model, thereby producing a further updated subsurface model; and j. using said at least a portion of said further updated subsurface model to explore for said natural resources within said predetermined volume of the earth.

14. A method of geophysical exploration according to claim 13, wherein step (h) comprises the steps of:

(h1) using at least said 3D frequency domain back propagated wave field and said 3D frequency domain forward propagated wave field to calculate a gradient volume, (h2) calculating a step length, and, (h3) using at least said gradient volume and said step length to update said current subsurface model, thereby producing an updated subsurface model.

15. A method of geophysical exploration according to claim 13, wherein step (j) comprises the steps of (j1) storing at least a portion of said further updated subsurface model on a computer readable medium; and, (j2) using said stored at least a portion of said further updated subsurface model to explore for said natural resources within said predetermined volume of the earth.

16. A method according to claim 15, wherein said computer readable medium is selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

* * * * *